INVENTOR.
FRANK E. DEEMS
BY
Jennings & Carter
ATTORNEYS

Aug. 7, 1956
F. E. DEEMS
2,757,601
COTTON BALING PRESS
Filed Jan. 9, 1953
4 Sheets-Sheet 2
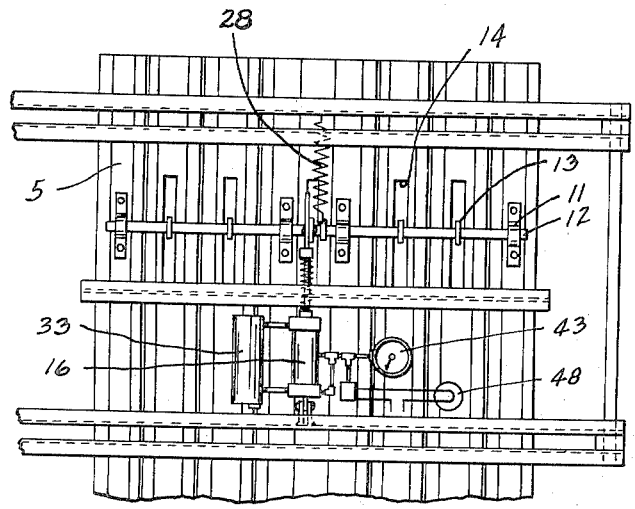
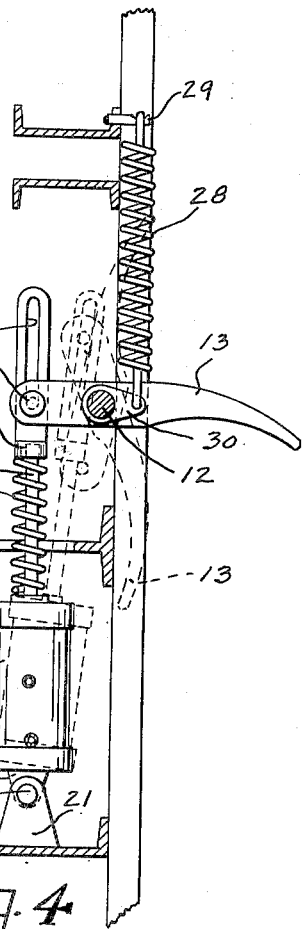
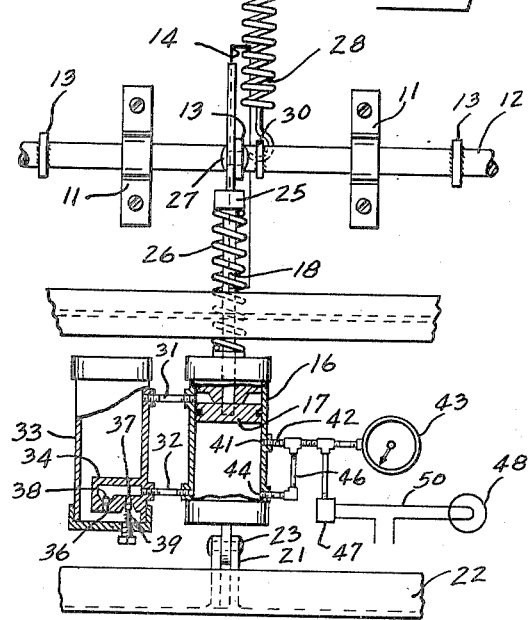
INVENTOR.
FRANK E. DEEMS
BY
Jennings & Carter
ATTORNEYS Aug. 7, 1956

F. E. DEEMS 2,757,601

COTTON BALING PRESS

Filed Jan. 9, 1953

INVENTOR.
FRANK E. DEEMS
BY
Jennings & Carter
ATTORNEYS

Aug. 7, 1956  F. E. DEEMS  2,757,601
COTTON BALING PRESS
Filed Jan. 9, 1953  4 Sheets-Sheet 4

INVENTOR.
FRANK E. DEEMS
BY
Jennings & Carter
ATTORNEYS

United States Patent Office 2,757,601
Patented Aug. 7, 1956

2,757,601

COTTON BALING PRESS

Frank E. Deems, Birmingham, Ala., assignor to Continental Gin Company, a corporation of Alabama Application January 9, 1953, Serial No. 330,530

5 Claims. (Cl. 100—99)

This invention relates to apparatus for indicating bale density and releasing the press dogs of cotton baling presses and has for an object the provision of such apparatus which shall permit free movement of the dogs during tramper operation and which shall automatically release the dogs when the bale is being pressed out.

Another object of my invention is to provide apparatus of the character designated which shall include means for indicating at all times the weights of the material being pressed as reflected by the pressure on the press dogs.

A more specific object of my invention is to provide a baling press embodying fluid pressure means which resists the pressure of the press dogs until a pre-determined pressure has been reached, together with means for returning and resetting the press dogs to normal tramping position after the bale has been pressed out.

A still further object of my invention is to provide automatic means for releasing press dogs and indicating the bale density while the bale is being pressed which shall be simple of construction, economical to manufacture and which may be readily installed on conventional types of baling presses.

Heretofore in the art to which my invention relates various forms of automatic press dog release mechanisms have been proposed; however, difficulties have been encountered with such mechanisms with which I am familiar, due to the critical adjustment needed to make them function properly. Manually operated press dog releases are often overlooked by the operator, causing damage to the dogs and mechanism and incurring excessive repairs. The automatic press dog releases heretofore employed with which I am familiar have been of a spring-loaded toggle type, which must be set close to the locking position in order to hold the dogs in place. These spring-loaded devices often fail to release, thus causing damage to the working parts. Furthermore, if the toggle adjustment is set so that there is no possibility of locking, the pressure on the dogs will cause the mechanism to release prematurely and become inoperative when large bales are being pressed. The above and other difficulties are overcome by means of my invention in which I employ a pressure-operated automatic release mechanism which resists the pressure on the dogs under normal tramper operation and which releases the dogs when a pre-determined pressure has been reached. After the bale has been pressed out and the pressure removed from the dogs, the dogs are returned automatically to normal tramper position.

Apparatus embodying features of my invention is shown in the accompanying drawings, in which:

Fig. 2 is an enlarged side elevational view showing the manner in which my improved apparatus is mounted on the baling press;

Fig. 3 is a detail enlarged view, partly broken away and in section, of the release mechanism shown in Fig. 1 and 2;

Fig. 4 is a view taken along the line IV—IV of Fig. 3;

Figure 1:
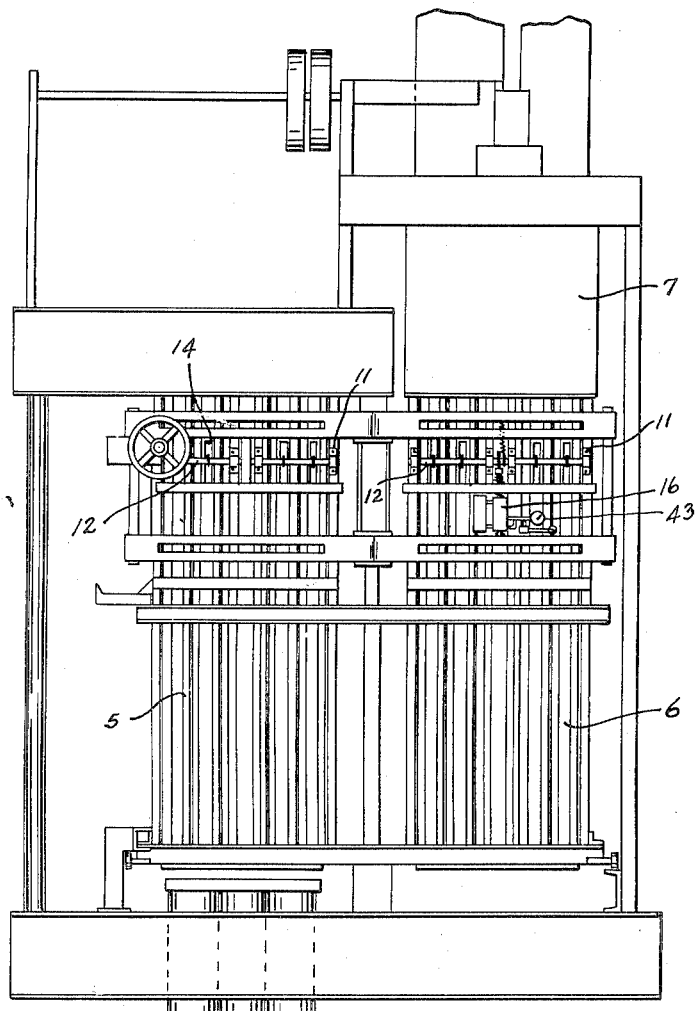
Fig. 1 is a side elevational view showing my improved apparatus mounted on an up-packing baling press.
Figure 5:
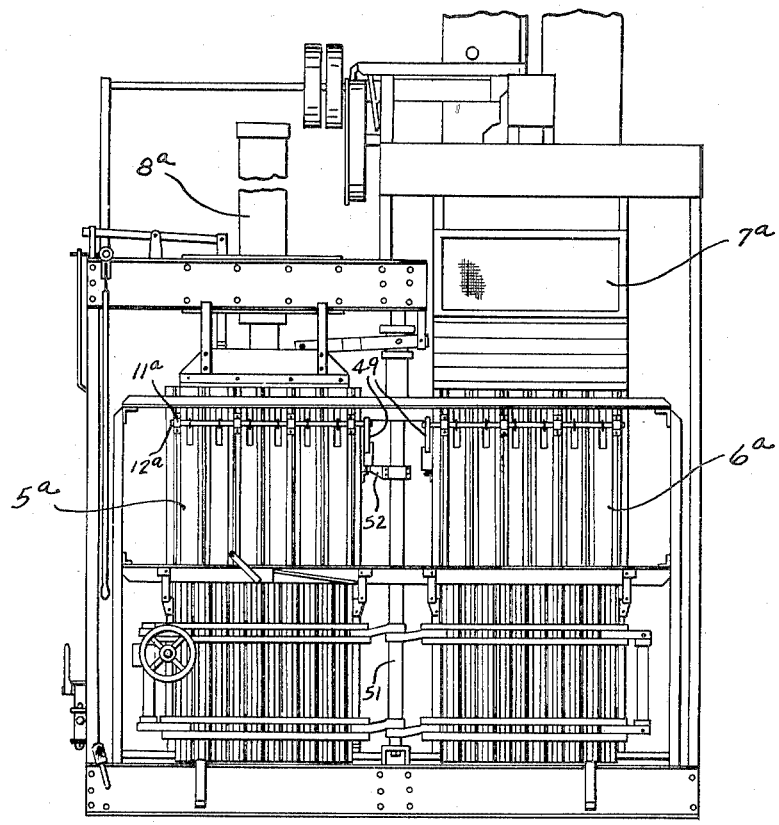
Fig. 5 is a side elevational view showing my improved apparatus mounted on a down-packing baling press.
Figure 6:
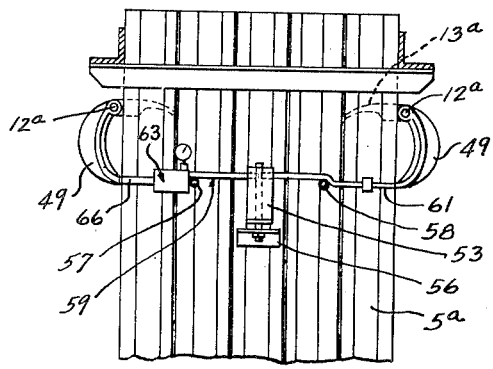
Fig. 6 is a fragmentary end view of the baling press shown in Fig. 5.
Figure 7:
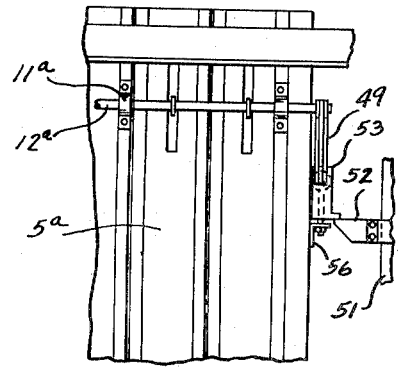
Fig. 7 is a fragmentary side elevational view of the apparatus shown in Fig. 6.

Referring now to the drawings for a better understanding of my invention, I show in Figs. 1 and 2 a cotton baling press having two press boxes 5 and 6. A tramper 7 is mounted over the box 6, and a hydraulic ram 8, under the box 5. As is well understood in the art, cotton is first tramped into the box 6 by the tramper 7 and the press is then turned to place the box 6 over the hydraulic ram 8, which then moves upwardly to compress the cotton in the box after which it is tied out. While the cotton in the box 6 is being compressed the box 5 is being tramped so that the process of tramping and pressing out is continuous. Mounted on each side of each of the press boxes in suitable bearings 11 is a press dog retainer shaft 12. Rigidly secured to each of these retainer shafts 12 are press dogs 13 which extend through suitable openings 14 in the side of the press box. Beneath each retainer shaft 12 is a hydraulic cylinder 16 having a piston 17 and a vertically extending piston rod 18. Each cylinder 16 is provided with a downwardly extending lug 19 which fits between a pair of upwardly extending lugs 21 secured to a channel member 22, which in turn, is mounted on the sides of the press box. The lug 19 is pivotally connected to the lugs 21 by means of a pivot pin 23. The upper end of each piston rod 18 is provided with an elongated vertically extending slot 24 and a shoulder or collar 25 at the lower end of the slot.

Surrounding the piston rod 18, intermediate the collar 25 and the upper end of the cylinder 16, is a compression spring 26 which biases the piston rod upwardly. The outer end of one of the press dogs 13, preferably one midway the ends of the retainer shaft 12, extends outwardly of the shaft 12 and is provided with a pin 27 which is adapted to fit slidably in the elongated slot 24. Connected to an inwardly extending arm 30 on the shaft 12 is the lower end of a tension spring 28. The upper end of the tension spring is connected to the sides of the press box as at 29, thus tending to rotate the retainer shaft 12 in a direction to lift the inner ends of the press dogs 13.

Communicating with the upper end of the cylinder 16, through a conduit 31, is a reservoir or supply tank 33. A conduit 32 connects the lower end of the cylinder 16 to the lower end of the supply tank. Positioned within the supply tank 33 and communicating with the conduit 32 is an inner valve housing member 34 having ports 36 and 37. An inwardly opening check valve 38 is provided in the port 36 which permits fluid to pass from the supply tank 33 through conduit 32 to the cylinder 16, but prevents the return of fluid. A spring loaded outwardly opening pressure relief valve 39 is provided in the port 37 which resists the fluid pressure exerted through the conduit 32 until a pre-determined pressure is reached, the pressure being controlled by the setting of the spring-loaded relief valve 39. The relief valve 39 is usually set to open at a pressure somewhat above that normally required to resist the pressure on the dogs 13 under normal tramping operations.

Communicating with the cylinder 16 through a port 41 in the side thereof is a conduit 42 which in turn communicates with a pressure gauge 43. The lower end of the cylinder 16 is provided with a port 44 which communicates with the conduit 42 through a suitable conduit 46. A pressure operated electric switch 47 also communicates with the conduit 42 and is employed to control a circuit 50 which actuates a signal 48, when a predetermined pressure is reached in the cylinder 16.

From the foregoing description the operation of the apparatus so far described will be readily understood. During normal tramper operation, the dogs 13 are held in position to move freely for tramping and the pressure gauge 43 indicates the density of the tramped cotton. Following the tramping operation the press is turned to place the box 6 over the hydraulic ram 8 and the pressure is applied upwardly on the cotton to compress it, which pressure acts on the inner ends of the dogs 13, tending to release them. When the pressure builds up in the cylinder 16 to the setting of the relief valve 39, the force exerted on the inner ends of the dogs 13 forces the piston 17 downwardly and fluid passes into supply tank 33 through the port 37. The piston 17 continues to move downwardly until the port 41 is uncovered after which pressure in the cylinder 16 drops substantially to zero due to the fact that the fluid then passes from the lower end of the cylinder to the upper end thereof through the conduit 46. Fluid above the piston 17 passes into the tank 33 through conduit 31. When the bale has been tied out and removed from the press, pressure being removed from the dogs 13, the piston 17 is returned to the upper end of the cylinder 16 by action of the compression spring 18, thus repositioning the dogs 13 for tramper operation. As the piston 17 moves upwardly in the cylinder 16 the fluid from the supply tank is returned to the lower end of the cylinder through the check valve 38.

Referring now to Figs. 5 through 9 inclusive I show my automatic press dog release mechanism and bale density indicator as applied to a down-packing press, having two boxes 5a and 6a. A tramper 7a is mounted over the box 6a and a hydraulic ram 8a over the box 5a. Mounted on the sides of each press box in suitable bearings 11a are dog retainer shafts 12a which carry inwardly projecting press dogs 13a. Secured to the inner end of each of the retainer shafts 12a is a counter-weight 49. Clamped to the center column 51 of the press is a lock trip member 52. Mounted on the inner end walls of each press box is a weight member 53 which is slidingly supported on a vertically extending rod 54 mounted on a bracket 56, which in turn is secured to the end wall of the press. The weight member 53 is adapted to move vertically on the rod 54 and is adapted to rest on the lock trip member 52 when the box press upon which it is mounted is in position for pressing a bale. Pivotally connected at 57 and 58 to the inner end of each press box on opposite sides of the weight member 53 are a pair of lock arms 59 and 61. Each weight member 53 is provided with a lateral projection 62 which extends toward the box on which it is mounted. The inner ends of the lock arms 59 and 61 extend beneath the projection 62 where they are retained in a substantially horizontal position during tramping operation. The lock arm 59 is shorter in length than the lock arm 61 and mounted on its outer end is a cylinder 63 having a piston 64 therein. Secured to the piston 64 and projecting outwardly of the cylinder 63 is a piston rod 66. The outer end of the rod 61 and the outer end of the piston rod 66 are positioned to engage the lower ends of the counter-weights 49 during the tramping operation thereby preventing the press dogs 13a from being released.

Figure 8:
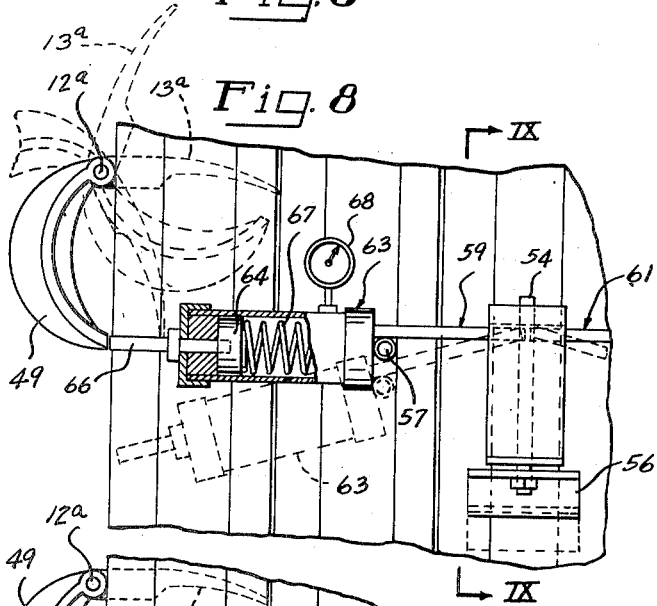
Fig. 8 is an enlarged view, partly broken away and in section, of the apparatus shown in Fig. 6.
Figure 9:
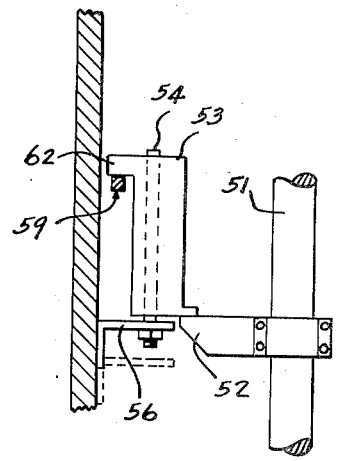
Fig. 9 is a view taken along the lines IX—IX of Fig. 8.

As is well understood in the art, down-packing press boxes are raised for turning from tramping position to pressing position. After the press box 6a is moved beneath the hydraulic ram 8a, the latter is lowered during the pressing operation. As the press box is lowered the weight 53, which rests on the lock trip member 52, is raised and the lock arms 59 and 61 move to the dotted line position, as shown in Fig. 8, thus releasing the counter-weights 49 and the press dogs 13a. A compression spring 67 is provided in the cylinder 63 inwardly of the piston 64 which moves the piston rod 66 outwardly after the bale has been pressed out, thus permitting the dog 13a to be returned to normal tramping position. Communicating with the cylinder 63 is a pressure gauge 68 which indicates the upward pressure of the cotton being tramped as applied to the dogs 13a and thus the density of the cotton.

Figure 10:
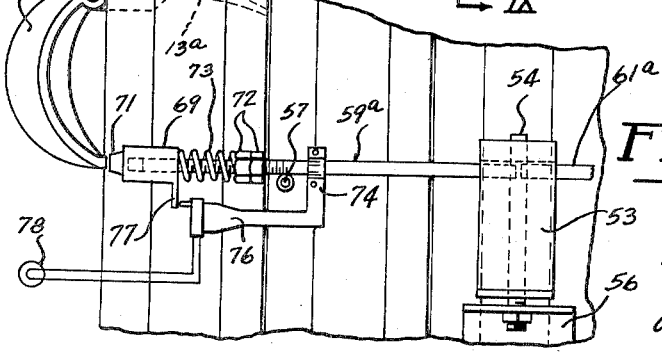
Fig. 10 is a side elevational view showing a modification of my apparatus.

In Fig. 10 I show a modification of the device shown in Figs. 5 to 9 in which I employ spring means instead of the hydraulic means for resisting pressure on the dogs together with an electric signal to indicate excessive pressure. Lock arms 59a and 61a are pivotally mounted on the inner ends of the press boxes in the same manner as lock arms 59 and 61. Slidably mounted on the outer end of the lock arm 59a is a sleeve member 69 having an outer end portion 71 which engages the lower end of the adjacent counter-weight 49. The outer end of the rod 59a is threaded for receiving adjusting nuts 72. Positioned between the adjusting nuts 72 and the sleeve member 69 is a compression spring 73 which resists the movement of the press dogs 13a during tramping operation.

Mounted on the end of the box press beneath the compression spring 73 on a suitable bracket 74 is an electric micro-switch 76. Secured to the sleeve member 69 is a downwardly projecting member 77 in position to engage the micro-switch 76 when the sleeve member is pressed inwardly. The micro-switch 76 actuates a signal 78, thus indicating to the operator when a predetermined pressure is being applied to the dogs 13a by the material being pressed. The nuts 72 provide means for adjusting the pressure required to overcome the spring 73. During tramping operation the dogs 13a are free to move downwardly from the dotted line or normal position shown in Fig. 10 and are returned to the normal position by the counter-weights 49.

The pressure applied on the dogs 13 and 13a gives an indication of the amount of material in the press box. Accordingly, the operator can always ascertain the density of the bale being tramped by reading the pressure gauge 43 or 68. Also, the signals 48 and 78 warn the operator when a predetermined density has been reached.

From the foregoing it will be seen that I have devised an improved automatic press dog release mechanism which includes means for indicating the density of the material being tramped. By providing an automatic fluid pressure operated release, the dogs are always released when the bale is being pressed out thus preventing damage to the apparatus. Also, there are no chances of the bale being released prematurely due to the fact that the dogs are not released until a pre-determined density has been reached.

While I have shown my invention in several forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a baling press having retaining dogs adapted for free tramping movement, of a fluid pressure cylinder mounted on said press adjacent said dogs, a piston in said cylinder, a vertically extending piston rod operatively connected to said dogs and holding them in free tramping position during the tramping operation and disposed to release said dogs in response to release of pressure in said cylinder, and means releasing the pressure in said cylinder when a predetermined pressure is exerted on the dogs thus permitting the piston to move downwardly and release said dogs.

2. The combination with a baling press having retaining dogs mounted on a retainer shaft and adapted for free tramping movement, of a fluid pressure cylinder mounted on said press adjacent said retainer shaft operatively connecting said piston to said dogs and disposed to release said dogs in response to release of pressure in said cylinder, a piston in said cylinder, a vertically extending piston rod, yieldable means on said piston rod holding said dogs in tramping position during the tramping operation, and means adapted to release the pressure in said cylinder when the piston has traveled through a portion of its stroke.

3. The combination set forth in claim 2 in which the means on the piston rod for holding the dogs in tramping position comprises a spring abutment on said piston rod, and a spring surrounding the piston rod between said spring abutment and the cylinder, there being an elongated vertically extending slot adjacent the outer end of said piston rod and an outwardly projecting member secured to the retainer shaft with a portion thereof slidably engaging said elongated slot.

4. The combination with a baling press having retaining dogs mounted on a retainer shaft and adapted for free tramping movement, of a cylinder mounted on said press below said dogs, a piston in said cylinder, a vertically extending piston rod, a reservoir, a conduit connecting the upper portion of said reservoir to the upper portion of said cylinder, a second conduit connecting the lower portion of said reservoir to the lower portion of said cylinder, a pressure relief valve in said reservoir adjacent said second conduit preventing the entry of fluid into said reservoir from the cylinder until a predetermined pressure is reached in said cylinder, a by-pass conduit connecting the central portion of said cylinder to the lower part thereof, a pressure gauge communicating with said by pass conduit, means biasing said piston toward the upper end of said cylinder, a seating member adjacent the upper end of said piston rod, and an outwardly projecting member secured to the retainer shaft with a portion thereof seated on said seating member.

5. The combination with a baling press having retaining dogs adapted for free tramping movement, of a hydraulic system operatively connected to the dogs, said system including a hydraulic chamber and a piston mounted for movement in each chamber, the upper end of the pistons being connected to the dogs and the initial pressure within the chamber holding the piston in such position as to resist the pressure exerted against the dogs by the material to be pressed and said pistons being disposed to release the dogs in response to release of pressure within the said chamber, and means releasing the pressure within the said chamber when the bale is being pressed out on the attainment of a predetermined pressure therein, such being attained in response to the pressure exerted by the material being pressed.

References Cited in the file of this patent

UNITED STATES PATENTS

| | | |
|---|---|---|
| 636,160 | Mitchell | Oct. 31, 1899 |
| 1,218,544 | Genter | Mar. 6, 1917 |
| 1,256,351 | Miller | Feb. 12, 1918 |
| 1,280,391 | Cameron | Oct. 1, 1918 |
| 1,521,865 | Cameron | Jan. 6, 1925 |
| 1,538,362 | Streun | May 19, 1925 |
| 1,553,434 | Cameron | Sept. 15, 1925 |
| 2,139,928 | Blewett | Dec. 13, 1938 |
| 2,579,444 | Taylor | Dec. 18, 1951 |
| 2,360,710 | Millson et al. | Mar. 10, 1953 |